Feb. 5, 1929.
T. HALL
1,701,481
CONTROL OF ARC LIGHTS FOR PROJECTORS
Filed June 29, 1921
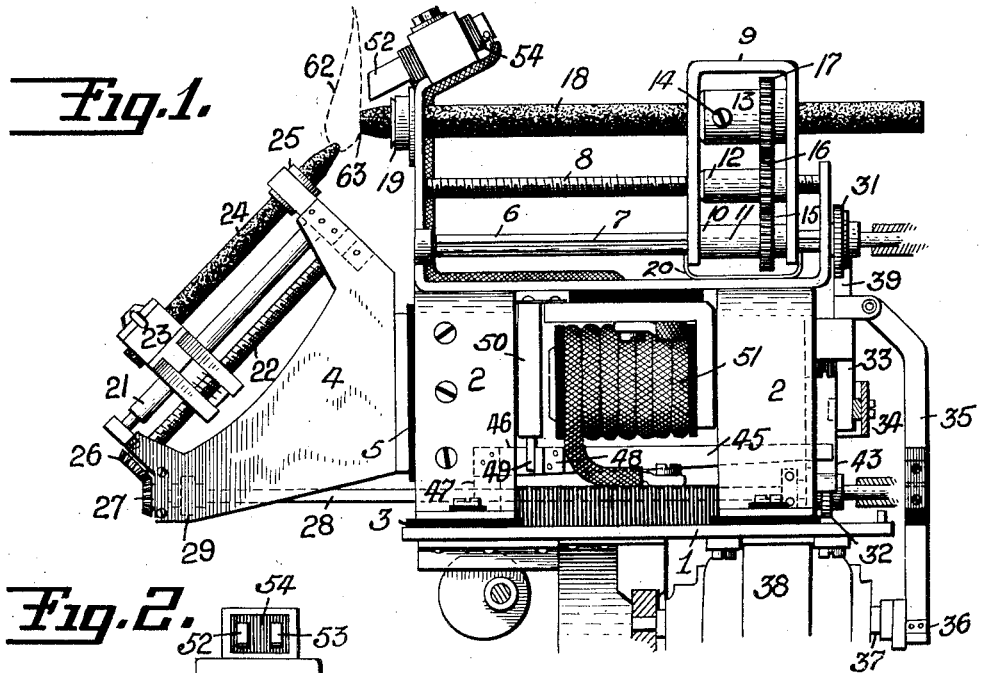
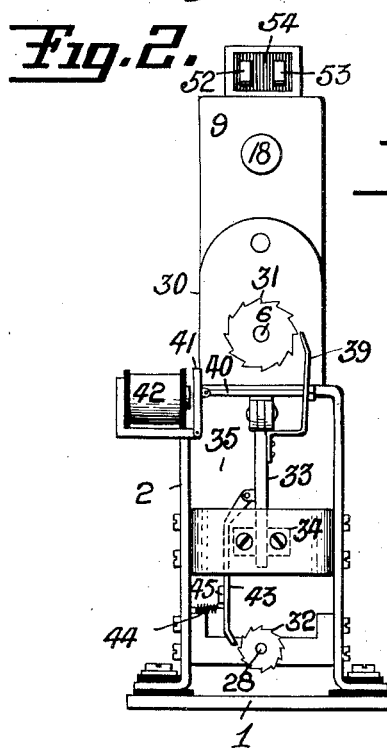
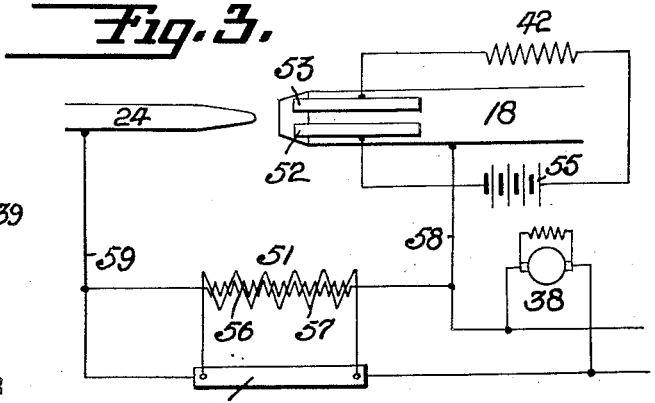
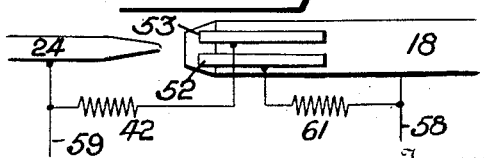
Inventor
THEODORE HALL
By his Attorney
Herbert H. Thompson Patented Feb. 5, 1929.

1,701,481

UNITED STATES PATENT OFFICE.

THEODORE HALL, OF BROOKLYN, NEW YORK.

CONTROL OF ARC LIGHTS FOR PROJECTORS.

Application filed June 29, 1921. Serial No. 481,300.

This invention relates to arc lamps and especially to lamps adapted for motion picture projection.

One object of the invention is to provide an arc lamp for the projection of motion pictures, wherein the high intensity flaming arc disclosed in U. S. Patents No. 1,227,210 or No. 1,328,311 for method of operating flaming arc lights for projectors, may be employed, and wherein the apparatus for automatically operating the electrodes and for controlling the arc will be simple and yet of a high degree of reliability.

Another object is to improve upon the type of coil and the manner in which it is used in controlling the length and steadiness of the arc employed.

Still another object is to effect an improvement in the third electrode type of control of the position of the positive electrode crater which contains a small ball of intense white flame. This ball which comprises the principal source of light must be properly maintained at the focal point of the light condenser system used.

In my Patent No. 1,679,718, granted August 7, 1928, for projector lamps, I disclosed a third or control electrode positioned near the crater tip of the positive electrode. This control electrode was connected with the arc circuit through an electromagnet coil. The armature of said magnet is connected to the positive electrode feeding mechanism so that when the arc engages the control electrode it closes the circuit through the magnet and causes the feeding mechanism to operate. By reason of the control electrode being in the arc circuit the engagement thereof by the arc flame causes a secondary arc to be set up between the control electrode and the regular arcing electrode of opposite polarity. This secondary arc is of course proportional to the current flowing through the control electrode circuit, which although comparatively low, is nevertheless sufficient to eventually cause considerable burning away of the control electrode. In my present invention I propose to overcome the secondary arcing by providing two control electrodes in the place of the one heretofore employed. These electrodes may constitute the terminals of an open circuit including the feeding magnet and a source of current entirely separate from the arc light circuit. The terminals being positioned adjacent the arc flame will be engaged thereby as the positive electrode burns back and the bridging of the gap between the terminals will close the control circuit and cause the feeding mechanism to operate.

A further object of the invention is to provide means for causing the positive electrode to rotate only while being fed, instead of continuously as has heretofore been the practice. The object of rotating the electrode is primarily to cause the burning out of a symmetrical crater. This object may be better attained if, when the crater edge becomes uneven, the farthest projecting portions thereof can be held for a moment in the upwardly sweeping arc flame, and the indented portions held for a time without the flame so as to enhance and retard the burning away of the projecting and indented portions respectively.

Referring to the drawings where I have shown what I now consider to be the preferred form of my invention:

Fig. 1 is a side elevation of a lamp constructed in accordance with my invention.

Fig. 2 is a rear elevation thereof, showing the mechanism for feeding the electrodes.

Fig. 3 is a wiring diagram.

Fig. 4 is a wiring diagram showing a modification in the connections of the control electrodes.

In the drawings, 1 represents the lamp base, upon which is mounted the main or rear portion 2 of the lamp frame, insulated from the base by insulation 3. The forward portion 4 of the frame may be secured to the rear portion and insulated therefrom as at 5. The rear portion of the frame may be provided with a rotatable rod 6 having a slot or groove 7, and a fixed threaded rod 8. Slidably mounted on said rods is a carriage 9. Rotatably mounted in said carriage and slidable upon rod 6 is a member 10, having a projection 11 reaching into the slot 7. Also rotatably mounted in the carriage is a nut member 12 in threaded engagement with rod 8. A third member 13 comprising an electrode holder is rotatably mounted in the carriage, and may have a set screw 14 for securing the electrode. These three members may be provided with gears 15, 16, 17 successively intermeshing. Thus, rotation of rod 6 will by reason of the projection 11 on member 10 engaging in slot 7, cause the member 10 to rotate. The gears will in turn cause members 12 and 13 to also rotate, and the rotation of the nut member 12 will cause the entire carriage to advance along rod 8, while the rotation of the electrode holding member 13 will cause rotation of the positive electrode 18, so that the electrode will be fed and rotated simultaneously. The forward end of the electrode 18 is shown as projecting through a guide 19 carried by the frame 2. This guide may also serve as a brush for the transmission of current from the frame to the electrode. Also the carriage 9 may have a resilient brush 20 having sliding engagement with frame 2 to insure good electrical contact between the frame and carriage; the current passing from the carriage through the electrode holder 13 to the electrode.

The forward portion 4 of the frame carries a fixed guide rod 21 and a rotatable threaded rod 22, upon which rods is mounted a carriage 23 having threaded engagement with the rod 22. This carriage is adapted to grip the negative electrode 24 as indicated. The forward end of this electrode may pass through a brush or guide 25 on the frame 4. The lower end of rod 22 may be provided with a bevel gear 26 meshing with a second bevel gear 27 on a rod 28; the said rod 28 being divided into two parts by an insulating coupling 29.

Rods 6 and 28 are shown as projecting beyond the rear end 30 of frame 2 (see also Fig. 2), and are provided with ratchet gears 31, 32 fixed thereon.

Mounted on the back of the frame 2 is a carriage 33 adapted for reciprocatory up and down movement in bearings 34. Pivotally attached to said carriage is a rod 35 reaching downwardly and having an eccentric connection at 36 with the shaft 37 of an electric motor 38.

On the reciprocatory carriage 33 is a pawl 39 connected by a link 40 to the armature 41 of an electromagnet 42. Said pawl is normally out of engagement with ratchet 31, but is brought into engagement therewith by energization of magnet 42, so that the reciprocatory movement of carriage 33 will cause the ratchet 31 to rotate. A second pawl 43 is attached to the carriage 33 to actuate ratchet 32. This pawl is normally held out of engagement with the ratchet by a spring 44 and may be engaged by an arm 45. This arm may have a resilient connection at 46 with a post 47 secured to frame 2, and may be provided with an outwardly reaching arm or bracket 48, engaged by a projection 49 on the armature 50 of an electromagnet 51. Energization of this magnet will thus throw the arm 45 to one side and move pawl 43 into engagement with ratchet 32.

Mounted on frame 2 above the positive electrode and adjacent the arcing end thereof I have shown two members 52, 53, insulated as indicated at 54 from each other and from the frame 2. These members comprise terminals of an electric circuit (see Fig. 3) which includes the electromagnet 42 and a battery or other source of electric supply 55.

As also shown in Fig. 3, the electromagnet 51 is provided with two windings 56, 57, one of which may be wound over the other as shown. These coils are wound in opposite directions so that when energized one will oppose the action of the other. The voltage coil 56, as shown, may be connected to the positive and negative feed lines 58, 59 so as to be in shunt with the arc, while the current coil 57 may be shunted around a resistance strip 60 interposed in the negative feed line and forming a part thereof. The negative feed line 59 could be wound directly over coil 56 to form coil 57, but because of its thickness I find it more convenient to use a separate wire as shown and forcing current therethrough by the use of the resistance 60. The purpose of this differential winding is to overcome variations in the strength of the magnet when the current in the feed lines varies.

When the current in the feed lines drops through some external cause, the strength of both coils 56 and 57 will drop so that the strength of the magnet will remain nearly constant, and the coils may be so proportioned that, within predetermined fluctuations of current in the supply lines, the variation in the strength of the magnet will be so slight that no feeding of the negative electrode will be effected. Thus it will be seen that fluctuations of current will not affect the length of the arc.

On the other hand, as the negative electrode is consumed and the arc length increases, the current will drop proportionately while the voltage will increase, so that the strength of the coils will differentiate rapidly. This will cause feeding of the negative electrode to take place.

In Fig. 4 I have shown a modified wiring of the control electrodes. Here, one of the control electrodes or terminals 53, is shown as connected through coil 42 to the negative side 59 of the supply line, while the other terminal 52 is connected through a resistance 61 to the positive side. As the arc flame is almost entirely negative there is no likelihood of arcing with terminal 53 which is also negative, while, with sufficient resistance in coil 61, there is practically no danger of arcing taking place with terminal 52.

The operation of the lamp is as follows:

When the current is turned on the motor 38 will begin to run and will run continuously throughout the operation of the lamp. There being no flow between the electrodes 18, 24, there will be no current in coil 57, but the voltage in coil 56 will be at its maximum. Armature 50 of electromagnet 51 will then be actuated, pressing arm 45 against pawl 43, which will engage and turn ratchet 32. This will feed the negative electrode into contact with the positive, whereupon maximum current will flow through coil 57 while the voltage in coil 56 will drop to minimum and feeding will cease. Rod 28 may then be rotated manually in the opposite direction to draw the arc. As soon as the arc begins to be overdrawn coil 56 will again predominate and pawl 43 will engage ratchet 32, preventing further backward rotation of the rod 28 and will feed the negative electrode forward again to establish the proper arc length. The arc flame 62 will sweep upwardly adjacent the terminals 52, 53, but out of engagement therewith when tip 63 of the positive electrode 18 is in the proper position. As this tip burns back and the flame follows, the flame will engage terminals 52, 53, bridging the gap between the terminals. The current conducting properties of the flame gases will cause the circuit through coil 42 to be closed. Armature 41 will now be attracted and will draw pawl 39 into engagement with ratchet 31 to rotate the same. This will cause rotation of nut 12 and the electrode holder 13. The nut 12 will cause feeding of the electrode and the holder 13 will cause the electrode to rotate. When the electrode tip 63 has been fed forward to move the flame out of contact with terminals 52, 53, feeding and rotation will cease.

Obviously, as the positive electrode is not constantly rotating, the upper portion of the end 63 will burn away more rapidly. This will again permit the flame to close the circuit across the terminals 52, 53. As soon as the electrode has been slightly rotated the burnt-away portion of the crater edge will be turned out of the flame and the projecting edge of the crater turned into the flame, pushing the latter out of engagement with the terminals and stopping the feeding until the projecting edge burns away. In this way the projecting portions of the electrode crater edge will be kept in the flame, and no portion of the crater edge will be permitted to project very far beyond the other portions.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an arc lamp, a carriage, electrode gripping means rotatably mounted on said carriage and provided with gearing, a fixed screw rod, a nut also rotatably mounted on said carriage and engaging said rod, said nut also being provided with gearing meshing with said first mentioned gearing, and automatic control means connected with one of said gearings for simultaneously rotating and advancing said gripping means.

2. In arc lamp, a pair of electrodes, means for simultaneously feeding and rotating one of said electrodes, an electromagnet for controlling said means, a source of energy associated with said magnet, and a pair of spaced terminals connected with said magnet and source positioned adjacent the arc tip of one of said electrodes and adapted when bridged to cause energization of said magnet.

3. In an arc lamp adapted to employ a pair of electrodes, separate means for feeding each of said electrodes, a pair of spaced terminals adjacent the arcing tip of one of the electrodes, a source of electric energy and electro-magnetic means electrically connected to said terminals, whereby bridging of the terminals by the arc flame will close a circuit through said magnetic means, said means being adapted to control one of said feeding means.

4. In an arc lamp, a pair of electrodes, means for feeding one of said electrodes, electromagnetic means adapted to control said means, a pair of spaced terminals adjacent the tips of said electrodes, said terminals being connected with said magnetic means and with a source of energy so that bridging of the terminals will close a circuit through the magnetic means.

5. In an arc lamp, a positive and a negative electrode, means including a control electromagnet for feeding one of said electrodes, a pair of spaced terminals adjacent the arc end of one of said electrodes, one of said terminals being connected through said electromagnet to the negative electrode and the other of said terminals being connected through a resistance member to the positive electrode.

6. In an arc lamp adapted to employ a pair of electrodes, means for intermittently feeding an electrode and simultaneously rotating the same only when feeding takes place, and means automatically controlled by the position of the lamp arc for controlling said first mentioned means.

7. In an arc lamp adapted to employ a pair of electrodes, the combination comprising separate feeding means for each electrode, a pair of spaced terminals adjacent the arcing tip of one of the electrodes, a source of electric energy and electromagnetic means electrically connected to said terminals for controlling the feeding of one of the electrodes when the terminals are bridged by the arc flame, and means for simultaneously rotating the latter electrode when feeding takes place.

8. In an arc lamp having a pair of electrodes, means for feeding and rotating one of said electrodes, and means for controlling said first means in which said controlling means includes a pair of conducting members positioned one on each side of the longitudinal axis of the respective electrode.

9. In an arc lamp having a pair of electrodes, means for feeding and rotating one of said electrodes, and means for controlling said first means in which said controlling means includes a pair of conducting members positioned one on each side of the longitudinal axis of the respective electrode and above the same.

10. In a high intensity flaming arc lamp, step-by-step means for rotating an electrode, means operated therefrom for feeding the electrode step-by-step, and means governed by the position of the arc for governing said feeding means by controlling said rotating means.

11. In a high intensity flaming arc lamp normally inoperative, means for simultaneously feeding and rotating an electrode at a greater rate than the normal consumption, and automatic means for bringing said first-named means into action only when the electrode burns back too far to both rotate and feed the electrode.

12. In a high intensity flaming arc lamp, means for intermittently rotating the electrode, means operated thereby for feeding the electrode when it is rotated, and means governed by the position of the arc flames for bringing said two other means into action.

In testimony whereof I have affixed my signature.

THEODORE HALL.